United States Patent [19]

Goodson et al.

[11] Patent Number: 5,128,548
[45] Date of Patent: Jul. 7, 1992

[54] MONITORING AND RECORDING DEVICE FOR LARGE GAME ANIMALS AND OTHER OBJECTS

[75] Inventors: William D. Goodson; John R. Alden, both of Shawnee, Kans.

[73] Assignee: Goodson & Associates, Shawnee, Kans.

[21] Appl. No.: 102,831

[22] Filed: Sep. 30, 1987

[51] Int. Cl.⁵ .................................. G01J 1/02
[52] U.S. Cl. ........................ 250/341; 256/338.1
[58] Field of Search .............. 250/338, 341, 342; 346/33 B, 33 A, 20, 60, 110 R; 377/6, 9, 20, 44

[56] References Cited

U.S. PATENT DOCUMENTS

| 3,924,130 | 12/1975 | Cohen et al. | 346/33 B |
| 3,929,277 | 12/1975 | Byrne et al. | 377/22 |
| 3,965,355 | 6/1976 | Maccabee et al. | 250/341 |
| 4,070,560 | 1/1978 | Blanyer | 377/9 |
| 4,088,990 | 5/1978 | Sass | 346/20 |
| 4,207,466 | 6/1980 | Drage et al. | 250/338.1 |
| 4,247,758 | 1/1981 | Rodrian | 377/6 |
| 4,441,196 | 4/1984 | Sanville | 377/9 |

FOREIGN PATENT DOCUMENTS 1193704  11/1985  U.S.S.R. .................................. 377/6

OTHER PUBLICATIONS

U.S.D.A. Forest Service Equip. Deve. Center & Scie. Dimen Inc. (Albuquerque, N.M.) "Trail Traffic Counter" Inst. Booklet. (no date).

Primary Examiner—Janice A. Howell
Assistant Examiner—Richard Hanig
Attorney, Agent, or Firm—Kokjer, Kircher, Bowman & Johnson

[57] ABSTRACT

A microprocessor based device for monitoring a location and recording the time and date of each event involving the presence of an object such as a deer at the monitored location. A transmitter of an infrared beam may be mounted on a tree on one side of a trail in alignment with an infrared receiver mounted on a tree on the opposite side of the trail. When an object breaks the beam, the time and date of the event are recorded in memory, and the time and date of each event may be retrieved from memory and displayed in chronological order on an LCD display on the face panel of the receiver. Alternatively, a portable printer may be used to obtain a printed record of recorded events. Optionally, a camera may be aimed at the monitored location and automatically activated to photograph the animals present at the monitored location. The electronics incorporates various power conserving features to provide long life for the batteries so that extended operation is possible in remote areas.

9 Claims, 4 Drawing Sheets

MONITORING AND RECORDING DEVICE FOR LARGE GAME ANIMALS AND OTHER OBJECTS

BACKGROUND OF THE INVENTION

This invention is directed to a device which monitors and records the traffic patterns of deer and other large game animals, as well as the pattern of movement of other objects, including vehicular and pedestrian traffic.

Big game hunters and particularly bow hunters go to great lengths to attempt to locate feeding trails and other paths along which deer and other large animals (including bear and elk) travel with consistency. Normal practice among bow hunters is to spend considerable time scouting an area to determine likely locations for deer traffic. Tree stands are then established at those areas considered to be likely locations of deer activity. Deer normally engage in feeding activity in the morning hours and again in the late afternoon and evening hours. Consequently, hunters typically station themselves in the tree stand in the morning and again in the late afternoon and evening and less frequently during midday times when deer activity is less likely.

Even the most skillful and experienced hunters are unable to predict with a high degree of accuracy whether and at what time animals will be present at a particular location, even if the area has been thoroughly scouted. One problem is that the scouting itself leaves human scents which can take up to several days to dissipate enough that they can no longer be perceived by animals. The current traffic patterns of deer in any event are difficult at best to accurately predict. For these reasons, it is not unusual for bow hunters to spend considerable time in tree stands which are set up at locations that desirable animals do not frequent, at least on a consistent basis. Conservation officers and forest service personnel also have need to monitor the movement patterns of various animals, including large game.

There are a number of other situations in which the ability to accurately monitor and record traffic patterns is highly desirable. For example, the patterns of vehicles along roadways can be a highly significant factor in determining the value of real estate and the desirability of establishing various types of businesses. It is usually as important to know when the traffic is most dense as it is to know the total number of cars which pass during a particular time period. By way of example, a proposed restaurant catering to dinner patrons would be more desirable at a location where the evening traffic is especially heavy. Traffic patterns during other times of the day may not be important. Similarly, the monitoring of pedestrian traffic along a particular sidewalk can provide information that is valuable to a wide range of businesses and governmental units.

Banks, fast service food outlets and other businesses which operate "drive through" windows can obtain useful information by monitoring when the drive-through traffic is heavy and when it is light or non existent. Added service personnel can be provided during times of heavy demand, and the personnel can be reduced when the demand for drive-through service is light. In this manner, the labor force can be used efficiently and labor costs can be carefully controlled without reducing the service to customers. The monitoring of vehicular and/or pedestrian traffic is either necessary or desirable in a number of other situations, as is the monitoring of the movement of other types of objects.

SUMMARY OF THE INVENTION

The present invention provides a microprocessor based device which can be installed at a selected location and which functions to record the exact times and dates when objects pass the monitored location. Thus, data which reflects the traffic pattern is recorded and can be retrieved and analyzed at a later time for various purposes. Although the preferred embodiment of the invention is constructed especially for the monitoring of large game animals such as deer, bear and elk in remote locations in the woods, the invention can be used to monitor the activity of other objects such as vehicular and pedestrian traffic along a selected route.

In accordance with the preferred embodiment of the invention, a transmitting unit and a receiving unit make up the major components of a two piece traffic monitoring system for large game animals. The transmitter can be mounted on a tree on one side of a trail, and the receiver can be mounted on a tree on the opposite side of the trail in alignment with the transmitter. An infrared beam from the transmitter is focused on an infrared sensitive detector in the receiver. Each time the beam is broken by an object passing the monitored location, the exact time and date of the event are recorded and stored in memory so that all of the events occurring over a period of a week or more can be called up and the data can be analyzed to determine the traffic pattern along the trail. For example, if the data indicate that a large animal passes the location at or near the same time every day for a week, a hunter can reliably predict that the animal will be present at the same time on a succeeding day, so hunting plans can be made to take advantage of this information.

The invention incorporates a number of features which make it well suited for use in remote areas such as wooded areas where electrical power is not available. Both the transmitter and receiver are battery powered, and the electronic components are selected and arranged to conserve power so that the batteries will operate long enough (a month or more) to allow hunters to gather sufficient data to allow them to accurately predict future consistent activity patterns. Among the power conserving features incorporated in the device are the transmission of the infrared energy in discrete bursts rather than continuously, the automatic disabling of the infrared transmitter if its batteries discharge far enough to possibly cause damage to the transmitting LED, and the automatic disabling of the receiver circuitry if the receiver battery is discharged to the point where additional battery draining could result in collected data being lost.

The invention is further characterized by the ability to automatically activate a camera in order to photograph an animal at the monitored location. The data collected by the unit can be retrieved either by displaying it in chronological order on an LCD display on the face of the receiver, or it can be printed by plugging a portable printer into the receiver. In either case, the photographs that are taken by the camera are correlated with the time and date record of each event which is photographed. The device can be programmed to operate the camera only during selected "windows" of time during which pictures are desired.

Another important feature of the invention is the ability to vary the transmission characteristics of the infrared energy, both as to the time between successive bursts of infrared energy and the number of pulses in each burst. Equally if not more important is the ability of the unit to be programmed with respect to the number of consecutive bursts that must be blocked before the machine makes the determination that a recordable event has occurred. By selecting a proper combination of the transmission characteristics, the device can be "custom tailored" to the conditions in which it is to be used. For example, by selecting the proper number of bursts that must be blocked before a recordable event occurs, the machine can distinguish between deer walking or moving in a relatively slow pace and falling leaves or running animals which are normally of no particular interest.

An additional feature of importance is the ability of the receiver to adjust itself to variations that are made in the time between successive bursts. This self adjustment occurs in the set up mode of the circuit and allows the burst rate to be varied without introducing error or requiring the receiver to be adjusted separately to each new burst rate.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
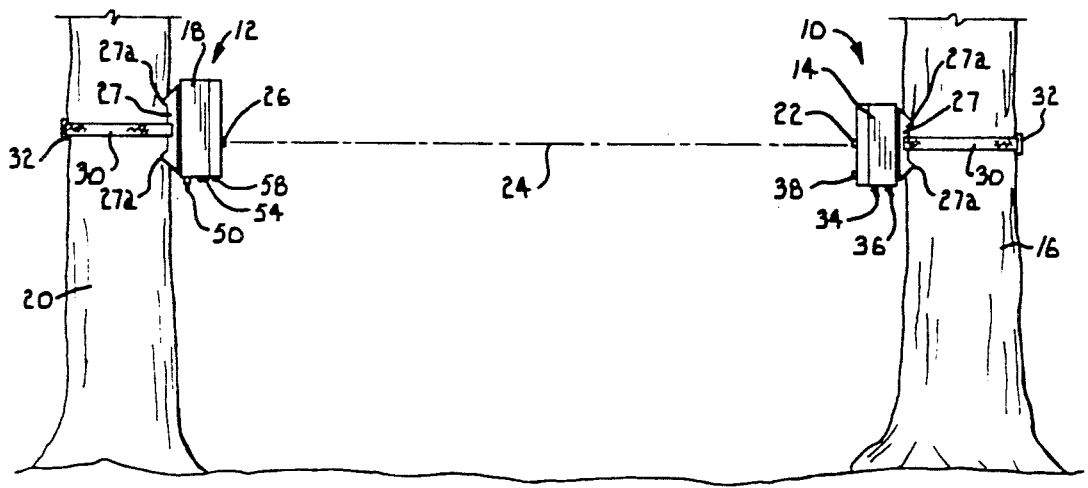
FIG. 1 is a side elevational view showing the two parts of the monitoring device of the present invention, with the transmitting unit mounted to a tree on one side of the monitored location and the receiving unit mounted to a tree on the other side of the monitored location.
Figure 2:
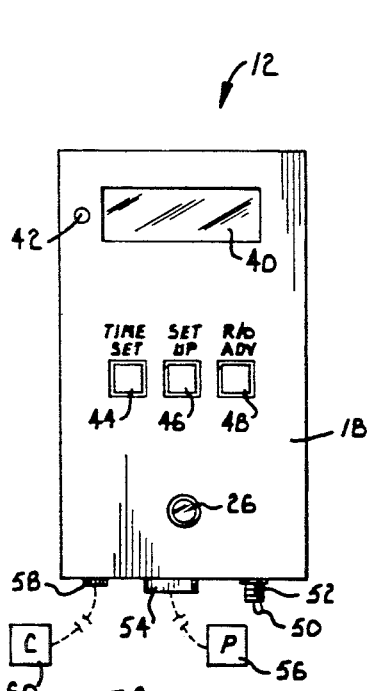
FIG. 2 is a front elevational view on an enlarged scale of the receiving unit.
Figure 3:
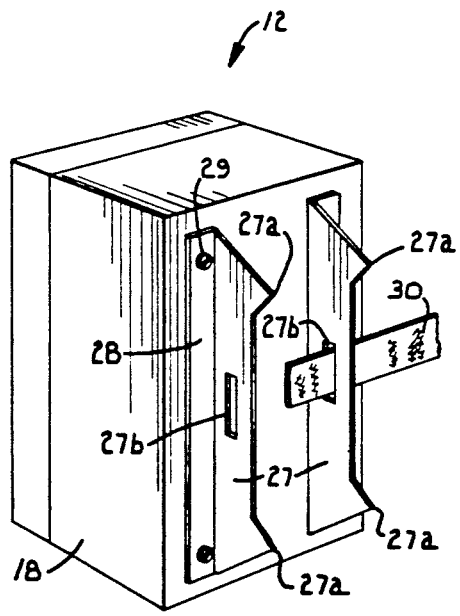
FIG. 3 is a rear perspective view of the receiving unit.

Referring now to the drawings in more detail and initially to FIGS. 1-3, the present invention is directed to a two-piece system for counting and recording the times and dates of objects passing a selected location. The two major components of the system are a transmitter which is generally identified by reference numeral 10 and a receiver which is generally identified by reference numeral 12. Although the counting and recording system is capable of monitoring the traffic patterns of a wide variety of objects, it has been found to be particularly useful in monitoring the traffic of large game animals such as deers, bears and elk. Accordingly, the transmitter 10 has a housing 14 which contains the electronic components and which may be secured to a tree such as the tree 16 shown in FIG. 1. The receiver 12 similarly has a protective housing 18 which may be mounted to a tree 20 in the manner shown in FIG. 1. The two trees 16 and 20 are on opposite sides of the location which is being monitored for game activity, and the location is typically along a trail in a wooded area.

The transmitter and receiver will normally be set back somewhat from the trail and camouflaged somewhat by brush and trees so that they will not be noticeable to other hunters or to animals. In any case, the front face of the transmitter case 14 is provided with a tube 22 from which an infrared beam 24 is transmitted toward the receiver 12 and particularly toward a receiving window 26 on the front face of the receiver case 18. The beam 24 is normally transmitted in a generally horizontal direction and at a height above the trail which would be generally centered on the body of the type of animal which is to be monitored. In actual practice, the beam 24 is divergent and expands away from the transmitter in a conical shape. However, before an object "breaks" the beam, it must block the relatively small receiving window 26. Preferably, the beam range is about 30 yards to allow sufficient camouflaging of the components.

In order to assure that the transmitting tube 22 remains in alignment with the receiving window 26, means are provided to mount each housing 14 and 16 in a stable manner. As best shown in FIG. 3 for the receiver 12, the casing 18 is provided on its back surface with a pair of small plates 27 each having a flange 28 oriented at a right angle to the plate. The flanges 28 are secured to the back side of casing 18 by screws 29 which are applied at locations to maintain the plates 27 spaced apart from and parallel to one another. The free edge of each plate 27 is provided with a pair of sharp teeth 27a at the top and bottom which bite into the bark of the tree on which the unit is mounted.

Each plate 27 is provided with a slot 27b through which an elongate flexible strap 30 is extended. The opposite ends of each strap 30 carry the mating components of a buckle 32 (see FIG. 1) or similar fastener. In this manner, the housing 18 can be applied to a tree at the proper height with the teeth 27a biting into the tree to provide stability to the housing and preventing it from shifting. The strap 30 can be drawn around the tree and held in a tight condition by the buckle 32, thereby securely mounting the housing on the tree. It is noted that the transmitter 10 is provided with a similar tooth and strap arrangement which permits it to be mounted in a stable position on the tree in the same manner.

In the position of the plates 27 shown in FIG. 3, the plates are at their minimum distance apart since they are located on the inside edges of the flanges 28. With screws 29 removed, the flanges 28 can be reversed such that the plates 27 are on their outside edges when the screws 29 are again applied. In this position, the plates are spaced apart the maximum distance to provide a broader base in a case where the unit is applied to a rather large tree. If the tree is relatively small, plates 27 are preferably in the position shown in FIG. 3 where the decreased distance between the two plates better accommodates the smaller diameter of the tree.

The housings 14 and 18 are preferably constructed to impede leakage of water which could possibly interfere with the electrical components of the system. However, the housings are not completely water tight, and a series of drain holes (not shown) is preferably provided in the bottom of each unit in order to drain off any water that does manage to leak into the housing. The bottom of the transmitter housing 14 is provided with an on/off switch 34 and a low power switch 36, both of which may be two position toggle switches. An indicator diode 38 is provided on the front face of housing 14 and indicates when the transmitter is in a low power set up mode for alignment, as will be explained more fully.

As best shown in FIG. 2, the front face of the receiver housing 18 is provided with the receiving window 26 and with a liquid crystal display 40 which provides a four character digital display. To one side of the display 40, an indicator diode 42 is provided to indicate when the receiver is in alignment with the transmitter during set up. A row of switches is also provided on the front face of housing 18. The switches include a time set switch 44, a set up switch 46 and a readout advance (R/O ADV) switch 48. An on/off toggle switch 50 is provided on the bottom of housing 18 and preferably has its actuator extending only a short distance out of a surrounding shield 52. This prevents deer and other animals from inadvertently brushing against the switch actuator to possibly move switch 50 to the off position. Also provided on the bottom of housing 18 are a nine pin socket 54 for receiving a jack from a portable printer 56 (shown diagrammatically in FIG. 2) and a camera socket 58 for receiving a jack from a camera 60 (also shown diagrammatically in FIG. 2) which may be focused on the location that is being monitored.

Figures 4, 5:
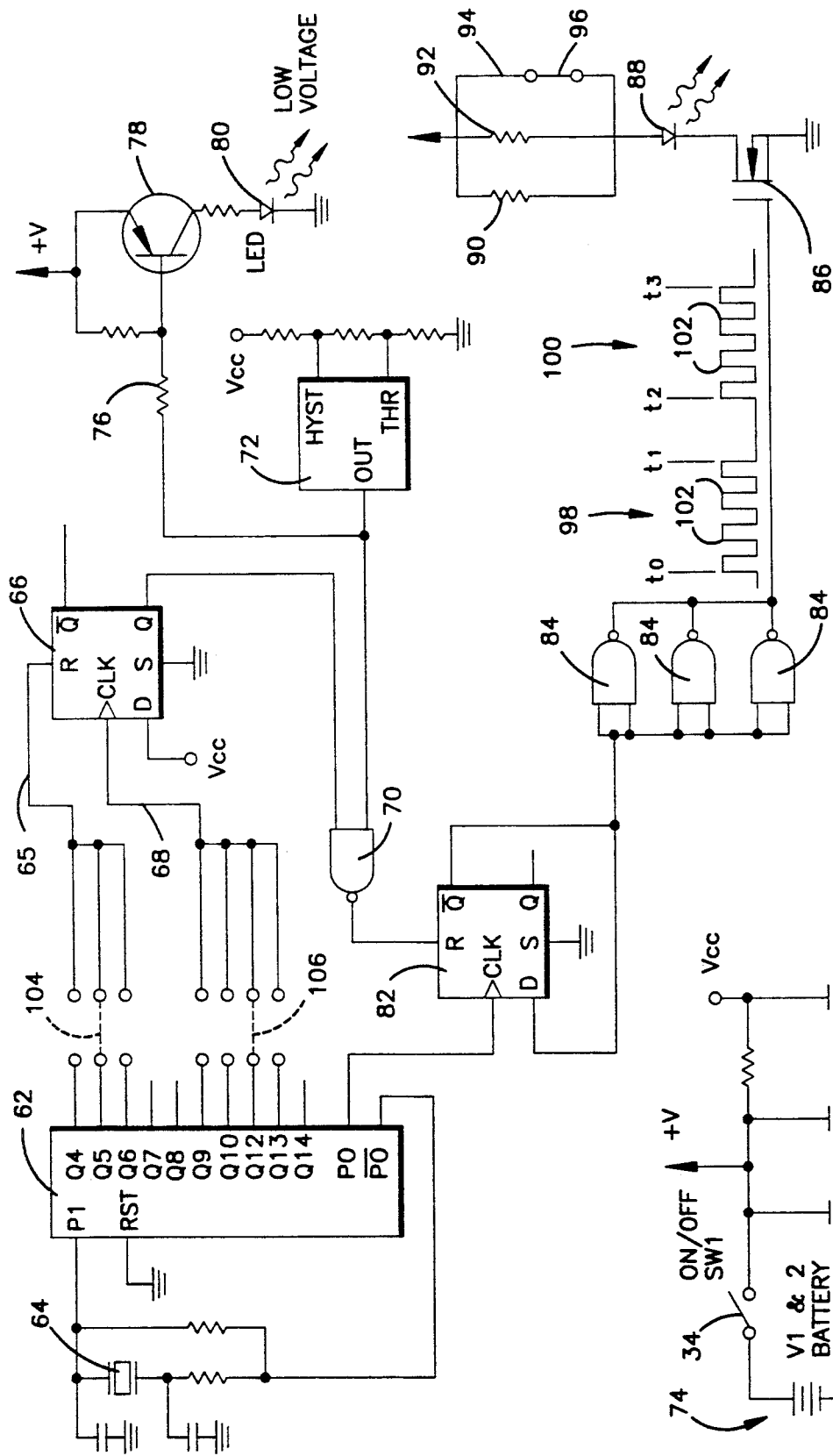
FIG. 4 is a schematic diagram of the electronic circuitry in the transmitting unit.
FIG. 5 is a schematic diagram of the power supply for the transmitting unit.

FIG. 4 schematically illustrates the electronic circuitry within the transmitter housing 14. A frequency divider circuit 62 is driven by a 84 KHz crystal oscillator 64. The predominant frequency at which the divider circuit is driven is divided into different frequencies which appear on the different output lines of circuit 62. Outputs Q4–Q6 may be selectively connected with a line 65 leading to the reset terminal of a clocked flip flop 66. The Q9–Q13 outputs of circuit 62 may be selectively connected with another line 68 leading to the clock input of circuit 66. The Q output of circuit 66 connects with one input of a NAND gate 70.

The second input to gate 70 comes from a voltage monitoring circuit 72 which monitors the output voltage of a battery supply 74 (see FIG. 5) which supplies power for operation of the transmitter 10. The output from the monitoring circuit 72 is also applied through resistor 76 to the base of a transistor 78. The transistor 78 serves as a switch between positive voltage and an indicating LED 80 which is energized when the transistor is conductive to provide an indication that the battery supply 74 is in a low voltage condition. The LED 80 may be located at a visible position on the transmitter not easily seen from the trail.

The output from gate 70 is applied to the reset input of a D type clocked flip flop 82 having its clock input tied to the P0 output from circuit 62. The $\bar{Q}$ output from the flip flop 82 is connected to the data input (of flip flop 82) and to a gate array comprising three NAND gates 84 connected in parallel. The output from the gate array controls a field effect transistor 86 which in turn controls a diode 88 which emits infrared energy when activated. Positive voltage is applied to diode 88 and through the FET 86 to ground when the FET is conductive. Connected in parallel between the voltage supply and diode 88 are a pair of resistors 90 and 92 and a line 94 which includes an open-close switch 96. When switch 96 is closed as shown in FIG. 4, diode 88 is energized in a high power level when the FET 86 is conductive. When switch 96 is open, diode 88 is energized in a low power mode due to the presence of the resistors 90 and 92.

As shown diagrammatically in FIG. 4, the signal on the output line of gates 84 is a wave form having a series of discrete bursts such as the successive bursts indicated generally by the numerals 98 and 100. Each burst includes a series of successive pulses 102 which are emitted during the time interval $t_1$–$t_2$ for bursts 98 and the interval $t_2$–$t_3$ for the next burst 100. The number of pulses 102 included in each burst may be controlled in accordance with which of the outputs Q4–Q6 of circuit 62 is connected with line 64. If the Q4 output is connected, each burst will include 4 pulses. If the Q5 output is connected, each burst will include 8 pulses. If the Q6 output is selected, each burst will include 16 pulses. A suitable switch such as indicated in broken lines at 104 in FIG. 4 may be provided to select which of the Q4–Q6 outputs is selected, thus determining the number of pulses in each burst. Alternatively, the selected Q4–Q6 output may be permanently strapped to line 64 at the factory. In any event, the number of pulses can be selected either by the manufacture or by the user.

The time interval $t_0$–$t_2$ between the initiation of successive bursts can likewise be selected in accordance with which of the outputs Q9–Q13 of circuit 62 is connected with line 68. Either 6 milliseconds, 12 milliseconds, 48 milliseconds, or 96 milliseconds can be selected by a suitable switch such as that indicated at 106 in FIG. 4. Alternatively, the selected Q9–Q13 output can be permanently strapped to line 68 at the factory.

The diode 88 transmits infrared energy from tube 22 in accordance with the wave form that is applied to the gate of the FET 86. Consequently, the beam 24 takes the form of a series of discrete bursts of infrared energy, with each burst including a plurality of pulses of infrared energy. The diode 88 is a 20 milliamp diode and is energized with typically between 3–5 amps of current. This relatively high current level generates infrared energy at high power levels which can be distinguished by the receiver from the background infrared radiation from the sun. At the same time, the battery power is conserved by transmitting the infrared energy in the form of successive discrete bursts as contrasted with continuous transmission.

Figure 6A:
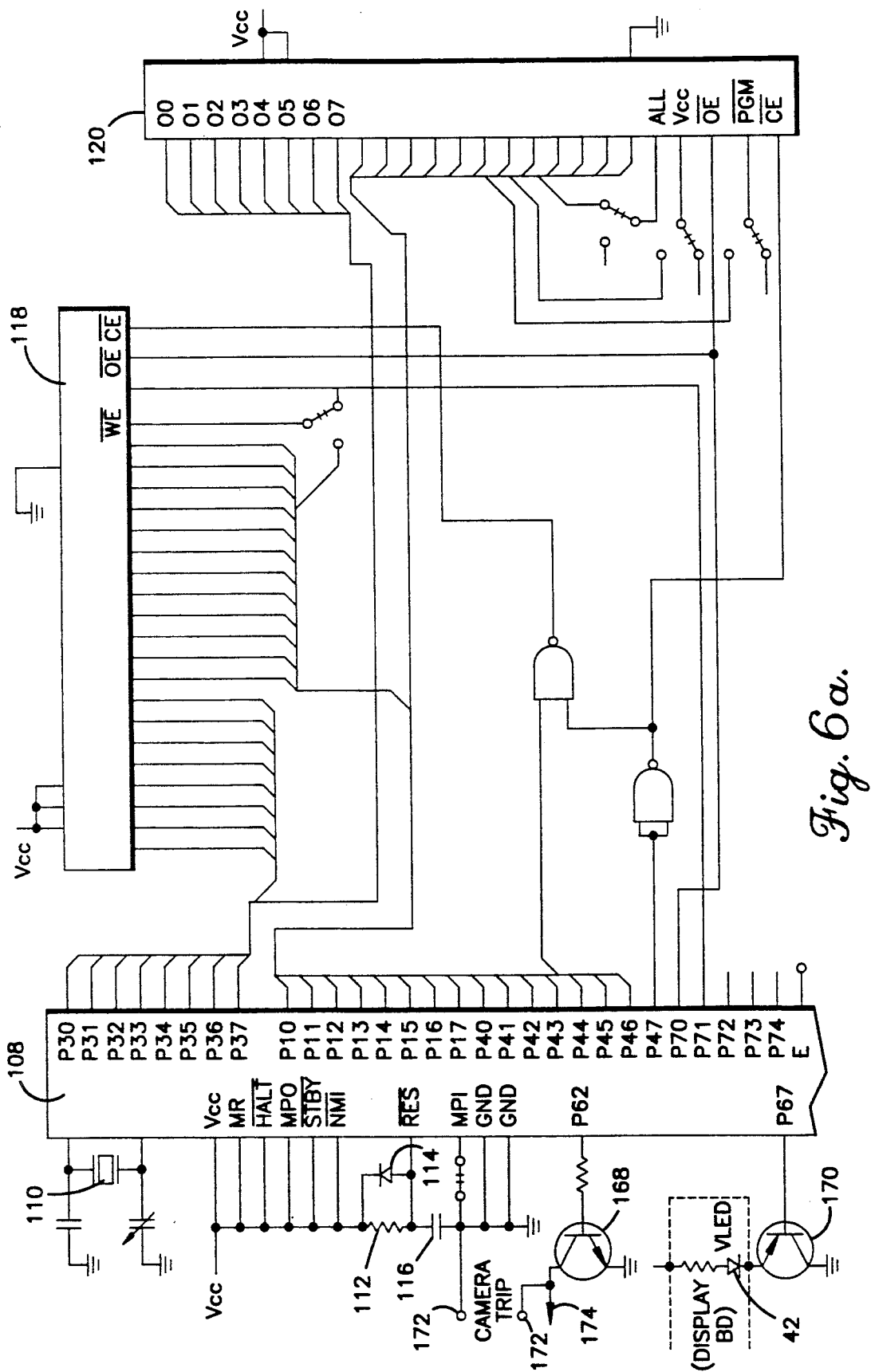
FIGS. 6a and 6b are schematic diagrams of the electronic circuitry in the receiving unit.
Figure 6B:
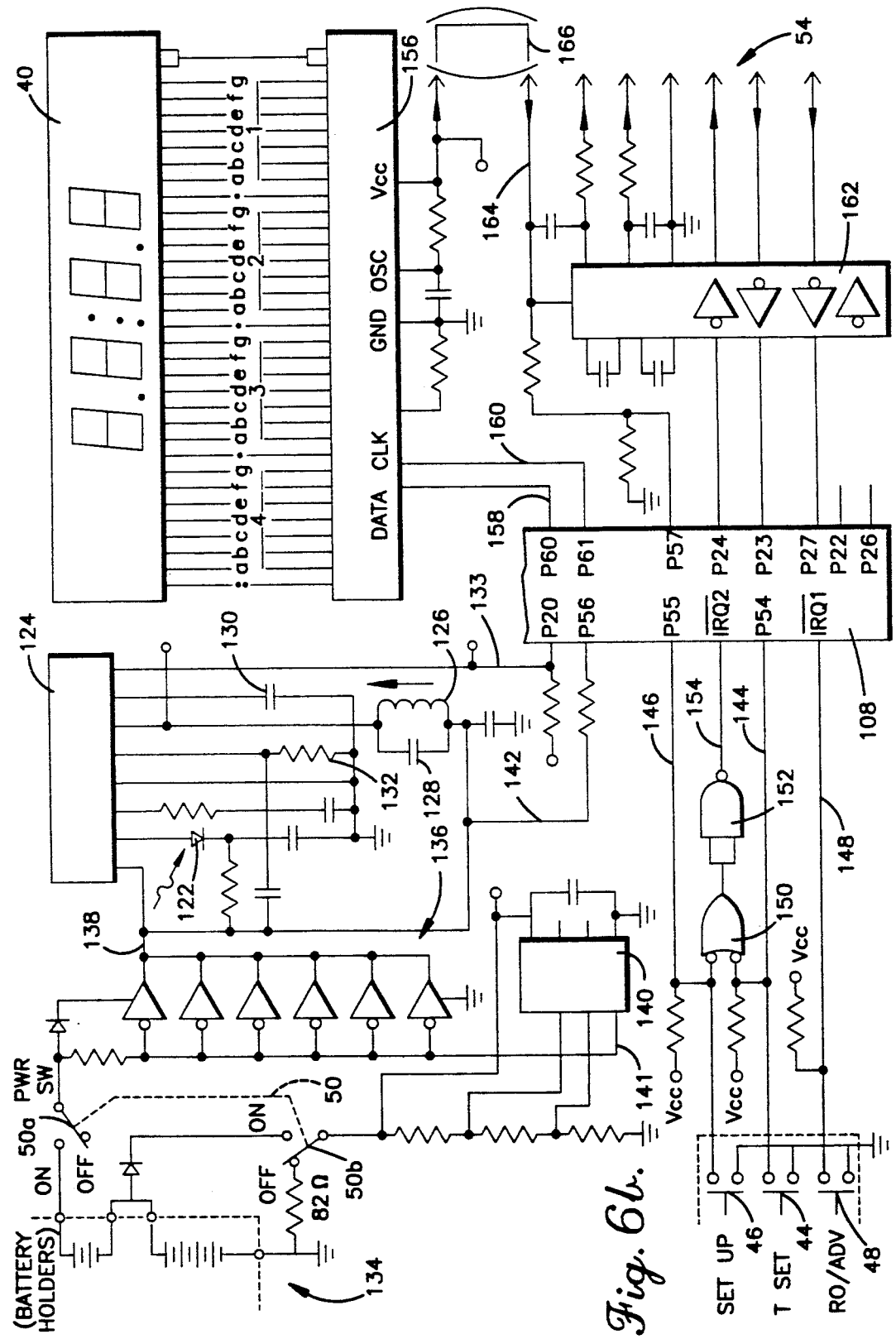

FIGS. 6a and 6b together form a schematic diagram of the electronic circuitry in the receiver housing 18. Referring first to FIG. 6a, numeral 108 generally identifies the microprocessor which is housed in the receiver and driven by a crystal oscillator 110. Power on-clear circuitry for the processor is provided by a network of resistor 112, diode 114 and capacitor 116. A volatile ram memory 118 is used to store the data which is collected by the device. The program memory is stored in an EPROM 120.

Referring now to FIG. 6b, an infrared sensitive diode 122 is located behind the receiver window 26 and is connected with a receiver integrated circuit 124. The receiver circuit 124 is tuned to the frequency of the transmitter by tuning a tank circuit which includes a coil 126 and capacitor 128. The output line 133 from the receiver chip 124 provides the microprocessor 108 with a signal indicative of whether or not the infrared beam is received and sensed by the diode 122. The microprocessor monitors line 133 during operation of the device to determine when the transmitter beam is received normally and when it is blocked to constitute an event that is to be recorded. More specifically, the processor receives pulses applied to line 133 and "goes to sleep" after the receipt of each pulse in order to conserve power. The processor expects to receive the next pulse at a predetermined time and if the pulse arrives, the processor receives it and goes to sleep again. If the pulse does not arrive when it should, the processor records a missed pulse, and if the programmed number of pulses are missed in succession, the processor records an event.

The receiver on/off switch 50 is a two gang switch having switch contacts 50a and 50b. Contact 50a supplies power in the on position from the receiver battery supply 134 to an array of inverters 136 comprising six CMOS inverters connected in parallel. The output line 138 from the inverter array is used to power the receiver circuit 124.

The voltage condition of the receiver battery supply 134 is monitored by a detection circuit 140 which is connected with the battery by contact 50b in the on position of switch 50. The output from circuit 140 is applied on line 141 to the inputs of the inverters in the inverter array 136. When the detector circuit 140 detects that the battery supply 134 has been drained below a selected voltage level, output line 141 changes state, and the inverters 136 then disconnect operating power from the receiver chip 124 by placing line 138 at zero volts. The receiver is then disabled and will not operate. The receiver normally uses approximately one-half of the total power, and removal of it from the circuitry prevents the battery from being drained so low that gathered data may be lost.

The state of the inverter output line 138 is transmitted via line 142 to the microprocessor 108, thereby informing the microprocessor when the battery is unduly drained and the receiver circuit 124 is disabled. The processor then goes into a memory back up mode, displays "Lo b" on the display, and makes all available power accessible to the RAM 118 in order to retain in memory all data that has been collected. The use of the inverter array 136 to control operating power for the receiver circuit 124 is preferred over a transistor switching arrangement or another conventional arrangement, primarily because the inverter array uses less power than transistor switching schemes.

With continued reference to FIG. 6b, the microprocessor 108 receives inputs from the time set switch 44, the set up switch 46 and the R/O advance switch 48 via lines 144, 146 and 148, respectively. Lines 144 and 146 are gated by the serially arranged gates 150 and 152, and the gated output signal is applied to the processor on line 154.

The LCD display 40 is controlled by a driver circuit 156 having its data and clock pins controlled by the processor via lines 158 and 160, respectively. The printer socket 54 connects with the microprocessor 108 through an interface circuit 162 which receives operating power via line 164 which also connects with the processor 108. Line 164 is normally disconnected from the power supply, so the interface circuit 162 is normally disconnected from power. However, when a printer jack is plugged into the socket 54, pins 7 and 8 are bridged by a jumper 166. Pin 7 is connected with battery supplied power, so the interface chip 162 is supplied with power through jumper 166 whenever the printer is connected. At the same time, line 164 informs the microprocessor 108 that a printer has been connected, and the microprocessor then prepare to service the printer in accordance with program instructions.

Referring again to FIG. 6a, the microprocessor 108 controls a pair of transistors 168 and 170. Transistor 168 is made conductive by the processor in order to activate the camera 60 which may be connected across the camera trip terminals 172. Transistor 170 controls the set up or alignment LED 42 located on the front face of the receiver housing 18. Transistor 170 is made conductive by the processor only in the set up mode when infrared energy from the transmitter is received by the infrared sensitive diode 122 in the receiver circuitry.

In use of the device to monitor game, the transmitter 10 and receiver 12 are mounted on the trees 16 and 20 on opposite sides of the zone which is being monitored for large game animal traffic. After the transmitter and receiver have been mounted, the receiver is turned on by moving switch 50 to the on position. The numeral 8888 initially appears on the LCD display screen 40, and the receiver then automatically goes into the time setting mode. In this mode, the hours digits flash to request that the hour of the current time be set, and the R/O advance switch 48 can be pressed until the current hour is reached in the hours digit on the screen. After the time set switch 44 is depressed, the display then flashes the minutes digits, and switch 48 can be depressed to advance the minutes digits on the display to the current time setting. The year digits then flash and switch 48 can be depressed until the current year is displayed. Next, the month digits flash until the R/O advance switch 48 has been depressed to advance the display to the current month. Finally, the day digits flash until the R/O advance switch 48 has been depressed to advance to the current day. It should be noted that a clock with a back up battery can be used in order to avoid the need to reset the current time and date each time the receiver has been turned off. The time set switch 44 must be depressed between each different time and date setting function.

After the time and date have been set in the foregoing manner, the display 40 requests entry of the number of successive bursts that must be blocked in order for the machine to determine that a recorded event has occurred. Any number from 1 through 9 can be selected by the user at this point by depressing switch 48 until the desired number comes up on the display 40. If no number is entered, the machine is programmed to enter a default number (3 in the preferred embodiment).

The device can be taken out of the time setting mode by pressing switch 44, and the machine then goes into the data gathering mode. Alternatively, if switch 44 is not pressed, the machine automatically goes from the time setting mode into the data gathering mode following the elapse of a preselected time (4 minutes in the preferred embodiment). Consequently, the device cannot inadvertently be left in the time setting mode for an indefinite time period and automatically goes into the data gathering mode if the user forgets to take it out of the time stting mode.

In order to assure that the beam 24 is properly aligned on the detection window 26, and the receiver is programmed by the transmitter, the set up or alignment mode can be entered by pressing the set up switch 46. Then, the microprocessor 108 will activate the indicator LED 42 via transistor 170 when infrared energy is sensed by the receiver circuit 124. Preferably, alignment of the transmitter and receiver is carried out with the transmitter in the low power mode. This is effected by opening switch 96 (FIG. 4). In the low power mode, the transmitter diode 88 operates at a reduced power level, and the infrared beam it emits is both reduced in power and in diameter as compared to full power operation. If the receiver is properly aligned with the transmitter in the low power mode, it will certainly be properly aligned in the high power operating mode, and assurance is given that the transmitting and receiving units are in proper alignment for successful operation.

Once alignment has been achieved, switch 96 is closed and the unit operates in the high power mode.

It is an important feature of the invention that the receiver is programmed to synchronize itself with the burst rate of the transmitter. In the set up mode, the receiver accepts bursts of infrared energy and is able to detect and lock in the burst rate. Later, when the unit enters the data collection mode, the processor looks for pulses at times determined by the burst rate. In this manner, the processor knows exactly when a pulse should be received and can accurately determine when a pulse is missed.

The set up switch 46 should be depressed at the end of the alignment process in order to place the machine out of the set up mode into a temporary display mode to show the current time, date, and event number. The unit then automatically falls into the data gathering mode. However, if the user inadvertently fails to press switch 46, the machine automatically goes into the data gathering mode after the elapse of a preselected time period such as 4 minutes. As soon as the machine goes out of the set up mode, the LED 42 is deenergized by the microprocessor which places transistor 170 in the nonconductive state.

When the device is operating in the data gathering mode, diode 122 and the receiver circuit 124 detect the beam 24 which is directed toward the detector window 26. The receiver circuit 124 is locked on the frequency of the transmitter. An animal passing between the transmitter and receiver blocks the beam 24 and prevents the receiver from detecting the beam for however long the animal is in the beam path. It is noted that rabbits, squirrels and other small animals will pass beneath the beam 24 and will not be detected.

If an animal blocks the beam long enough to block in succession the number of bursts selected by the user (or the default number of bursts if no number is selected), the microprocessor senses that fact and records the occurrence of an event. The lack of pulses occurring on line 133 indicates to the processor that the beam is obstructed by an object between the transmitter and receiver. Once the selected number of bursts have been missed, the processor records it as an event. The exact time and date of the event is entered into the memory 118 and retained there until called up at some future time. Subsequent instances of animals passing through the beam 24 are recorded and stored in the memory in the same manner. The microprocessor preferably operates in a "sleep" mode and goes to "sleep" after processing each pulse.

The device may be left in place for an indefinite time period to monitor the passage of animals in this manner. Because of the power conserving features incorporated in the transmitter and receiver, the device can normally be left in the field up to two months and still collect data. If the transmitter battery supply 74 is drained so low that the circuitry could possibly malfunction and energize the transmitting diode 88 long enough to burn the diode out, the detector circuit 72 senses the low voltage condition of the battery and disables the transmitter via gate 70. Additionally, if the receiver battery supply 134 is drained so low that collected data may possibly be lost, the low voltage condition of the battery is sensed by detector circuit 140, and the inverter array 136 removes operating power from the receiver circuit 124. The microprocessor is informed of the low battery condition via line 142 and goes into the memory backup mode in which the available power is used to conserve in memory the data that has been collected and stored. The processor then displays the designation "Lo b" on display 40, and the time and date the memory backup mode was entered is stored in memory. It has been found that the device can operate in the memory backup mode for up to several months without losing the collected data.

Retrieval of the data that has been collected by the receiver is effected by pressing the R/O advance switch 48 in succession. The first pressing of switch 48 results in the date of the first recorded event (event no. 1) being displayed on screen 40. The next depression of the switch results in a numerical display of the event number for about 1 second, then the time of that event. Switch 48 can be pressed again to display the number of the second event (event no. 2), followed by its time. The user can continue to successively depress switch 48 to cause the events to be displayed in chronological order with the time of each event being displayed subsequent to its event number. If the date changes between events, the next switch 48 depression will cause the new date to be displayed and held prior to going on to display event and time on subsequent depressions of switch 48. It is noted that dates on which no event has occurred are skipped by the display. When data as to the time and date of all recorded events has been displayed, the display 40 displays the designation "thru" to inform the user that all of the events have been displayed.

As the user is retrieving the data, he will normally record it manually in written form on his log or record. He can analyze the written record of events to detect any traffic pattern that may be useful to him. For example, if the data indicate that the beam has been blocked every day at or around 7:00 a.m., it is predictable that the same animal will be in the same vicinity at a time around 7:00 a.m. the next day. This could allow the user of the device to be prepared in a nearby tree stand at the time of the animal's appearance. It is also pointed out that, in the event that the memory backup mode has been entered, the time and date of entry into the memory backup mode is stored in memory and is displayed on the LCD display during retrieval of the data.

The machine retains collected data in memory until the memory is intentionally cleared. Consequently, until the memory is cleared, the user can cycle through the display as many times as necessary to confirm that all of the data has been copied accurately on his written log.

In order to clear collected data from the memory, it is necessary to enter the set up mode (by depressing switch 46) and then pushing the R/O advance switch 48. The display 40 will then display the designation "CLR" to indicate that the machine is in a clear mode in which the memory can be cleared. If the setup switch 46 is depressed while in the clear mode, the memory is erased. Consequently, it is necessary for the user to intentionally erase data and there is little chance of data being inadvertently cleared from the memory.

Conservation officials and hunters having a number of monitoring devices in the field may elect to use a portable printer to retrieve data rather than manually recording it from the display screen 40. In order to obtain a printed record of the data that has been collected by the device, it is necessary to plug the portable printer 56 into the printer socket 54. As soon as the printer has been plugged in, that fact is conveyed to the microprocessor 108 via line 164, and the microprocessor prepares itself to service the printer. Following switch controlled preparations, the R/O advance button 48 can be depressed, and the stored data is provided to the printer via the interface circuit 162, and the printer automatically prints a record of the collected data. The time and date of entry into the memory backup mode is also printed, if such mode has been entered.

It has been found convenient for the data to be printed in columnar form with three columns being headed from left to right by the headings "event", "time", and "date". The event numbers are printed out successively in the event column, while the corresponding times and dates are printed in horizontal rows beside the event number. It has also been found convenient to omit date entries for events which occur subsequent to a prior event on the same day. Thus, if the date entry is absent from any particular event number, the appropriate date is readily apparent from noting the date of the nearest preceeding entry which does have a printed date corresponding to it.

As previously suggested, the camera 60 can be plugged into the camera socket 58 in order to automatically provide a photograph of the animal that causes each recorded event. It is a particular feature of the invention that two different "windows" of time can be programmed into the machine to permit the camera to take photographs only during the programmed time periods. In order to set the time windows, the user first enters the time set mode by depressing switch 44. Then, while depressing the time set switch 44, the set up switch 46 is pressed to enter the camera time setting mode. The display first asks for the start time of the first picture taking window (time zone 1), and the user depresses switch 48 until the desired time appears on the screen. Next, the end of the first picture taking window is requested, and the user selects the ending time by depressing the switch 48 until the desired ending time of the first time zone appears on the screen. The second time zone is set in the same manner.

By way of example, since deer activity is most prevalent in the morning hours and in the late afternoon or early evening hours, a user desiring to photograph a deer at the monitored location may select the hours of 6:30-8:00 (6:30 a.m. to 8:00 a.m.) for the first time zone and the hours 17:00-20:00 (5 p.m.-8 p.m.) for the second time zone. The camera will then be activated to take pictures only for events which occur during the selected time periods.

It should be noted that the camera can be programmed to take pictures continuously simply by failing to enter an ending time for the first time zone. Alternatively, the second time zone can be bypassed altogether by entering the number 0 as the starting time for time zone number 2.

The camera 60 will normally be aimed at the area that is being monitored in order to photograph an animal which breaks the beam 24. When the camera is connected between the camera trip terminals 172, the microprocessor 108 activates the camera via transistor 168 each time a recorded event occurs during one of the permissible time windows that has been programmed by the user. The software which controls the processor prevents the camera from being operated again within a preselected time (2 minutes, e.g.) following each photograph. This prevents a number of photographs from being taken of an animal rooting around in the monitored zone.

Preferably, a fourth column headed by "frame number" is provided on the printout and the frame number of all photographs taken is printed in this column in the horizontal row of the corresponding event number. When the user cycles through the display for the collected data, a decimal point or other indication is provided on the display 40 for event numbers which correspond to the taking of a photograph. Thus, the user recording the information manually can note on his written log that a particular photograph corresponds to a particular event number.

The programability of the number of pulses per burst of transmitted infrared energy, the time between bursts, and the number of bursts that must go undetected before an event is indicated provides the device with the ability to be "custom tailored" to the particular operating conditions it is expected to encounter. For example, if deer are being monitored, it has been found that a setting of 8 pulses per burst, 48 milliseconds per burst cycle, and blocking of the beam for three successive bursts provides optimum conditions for detecting deer walking at a normal pace while avoiding the detection of falling leaves or animals running between the transmitter and receiver. Accordingly, it has been found convenient to set switches 104 and 106 at the settings found in FIG. 4 and to provide a default value of 3 if the user does not enter a number in response to a request for entry of number of bursts that must be blocked in succession in order for an event to be indicated. A lesser number can make the detection overly sensitive and unduly power consumptive, whereas a greater number can result in events being missed.

Although the preferred embodiment of the invention has been illustrated and described as being useful to monitor deer, the device is equally useful in the monitoring of other animals and especially large game animals such as elk and bears. The device may also be used to monitor the traffic patterns of other objects such as vehicular traffic and pedestrian traffic in order to provide useful information as to the exact time and date of each object passing the location that is being monitored. For example, the traffic patterns along selected roadways or drive-through retail establishments can be monitored, and businesses or governmental entities can be provided with specific time and date information as to the traffic patterns.

It should be noted that the transmitter and receiver can be incorporated in a single unit, with a reflector positioned on the opposite side of the monitored zone to reflect the beam back to the receiver. However, there are energy losses in the reflector and the beam path length is doubled. Thus, the power requirements are greater and the range is reduced. In addition, an object in the beam path can reflect enough energy to cause the event to be missed (e.g., deer with shiny coats or automobiles with shiny finishes). For these reasons, single part systems are less desirable than the two part device illustrated and described therein. Passive infrared systems are also possible with the warm blooded animal acting as the transmitter. This type of system requires sophisticated detection techniques and in any event is unable to distinguish deer from rabbits or squirrels since the beam height cannot be set as it can in the preferred embodiment of the present invention.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Apparatus for recording the movement of large game animals past a preselected location, said apparatus comprising:

means for directionally transmitting infrared energy in a path intersecting said preselected location and in a series of discrete bursts each including a selected number of infrared pulses and each being transmitted at a selected time following the immediately preceding burst;

infrared sensitive receiving means adapted for placement along said path to detect the bursts of infrared energy that are transmitted past said preselected location;

means associated with said receiving means for providing an electrical signal indicative of the presence of an animal at said preselected location whenever a predetermined number of bursts in succession are not detected by said receiving means;

means for storing data representative of the time and date of each signal provided by said signal providing means; and means for retrieving said data.

2. Apparatus as set forth in claim 1, including means for varying said predetermined number of bursts.

3. Apparatus as set forth in claim 1, including means for varying the number of pulses in each burst.

4. Apparatus as set forth in claim 1, including means for varying the time between each burst and the next succeeding burst.

5. Apparatus as set forth in claim 1, wherein said data retrieving means comprises means for displaying the time and date of each signal in chronological order.

6. Apparatus as set forth in claim 1, wherein said data retrieving means includes means for printing a printed record of the time and date of each signal with the times and dates arranged in the chronological order of the signals.

7. Apparatus as set forth in claim 1, including:

a camera adapted to be focused on said preselected location; and means for activating said camera to photograph said preselected location in response to generation of a signal by said signal generating means.

8. Apparatus as set forth in claim 7, including means for disabling said camera to prevent it from photographing during selected times and enabling the camera to permit it to photograph during other selected times.

9. Apparatus as set forth in claim 4, wherien said receiving means includes means for detecting the time between successive bursts and automatically adjusting to a new time between bursts when the time between bursts is varied.

* * * * *